(12) United States Patent
Simmons et al.

(10) Patent No.: US 8,959,376 B2
(45) Date of Patent: Feb. 17, 2015

(54) SHARING POWER BETWEEN TWO OR MORE POWER SHARING SERVERS

(75) Inventors: Charles R. Simmons, Durham, NC (US); Mitchell D. Walker, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 846 days.

(21) Appl. No.: 12/821,802

(22) Filed: Jun. 23, 2010

(65) Prior Publication Data

US 2011/0320826 A1 Dec. 29, 2011

(51) Int. Cl.
G06F 1/00 (2006.01)
H02J 1/10 (2006.01)
G06F 1/26 (2006.01)
H02J 4/00 (2006.01)

(52) U.S. Cl.
CPC .... *G06F 1/26* (2013.01); *H02J 4/00* (2013.01)
USPC ............................................. 713/340; 307/29

(58) Field of Classification Search
USPC .......... 713/300, 310, 340; 307/18–20, 25, 29, 307/36
See application file for complete search history.

(56) References Cited

U.S. PATENT DOCUMENTS

| | | | |
|---|---|---|---|
| 4,701,845 A | 10/1987 | Andreasen et al. | |
| 5,027,002 A | 6/1991 | Thornton | |
| 5,765,001 A | 6/1998 | Clark et al. | |
| 6,115,822 A * | 9/2000 | Kim et al. | 713/310 |
| 6,480,972 B1 | 11/2002 | Cromer et al. | |
| 6,526,516 B1 * | 2/2003 | Ishikawa et al. | 713/340 |
| 7,046,983 B2 * | 5/2006 | Elkayam et al. | 455/402 |
| 7,091,933 B2 | 8/2006 | McClintock et al. | |
| 7,721,125 B2 * | 5/2010 | Fung | 713/320 |
| 7,816,811 B2 * | 10/2010 | Tupman et al. | 307/31 |
| 8,145,327 B2 * | 3/2012 | Banks et al. | 700/19 |
| 2001/0005894 A1 * | 6/2001 | Fukui | 713/310 |
| 2003/0110403 A1 * | 6/2003 | Crutchfield et al. | 713/300 |
| 2007/0276548 A1 * | 11/2007 | Uzunovic et al. | 700/297 |
| 2008/0192431 A1 | 8/2008 | Bechtolsheim | |
| 2008/0294915 A1 | 11/2008 | Juillerat et al. | |
| 2009/0113221 A1 * | 4/2009 | Holle et al. | 713/310 |
| 2009/0158057 A1 | 6/2009 | Begun et al. | |
| 2009/0164824 A1 * | 6/2009 | Langgood et al. | 713/340 |
| 2009/0204667 A1 | 8/2009 | Diaz et al. | |
| 2009/0234512 A1 * | 9/2009 | Ewing et al. | 700/295 |
| 2009/0265564 A1 * | 10/2009 | Clemo et al. | 713/300 |
| 2011/0266867 A1 * | 11/2011 | Schindler et al. | 307/24 |

* cited by examiner

*Primary Examiner* — Khanh Dang
(74) *Attorney, Agent, or Firm* — Edward J. Lenart; Katherine S. Brown; Biggers Kennedy Lenart Spraggins LLP

(57) ABSTRACT

Methods, systems, and power sharing servers that include a computer processor; a computer memory operatively coupled to the computer processor; a power supply unit coupled to a power domain unit via a power supply unit port; an intravoltage port configured to receive a shared power cable coupled to an intravoltage port of a different power sharing server; and a transfused power card coupled to the power supply unit via a primary input power line, the transfused power card further coupled to the intravoltage port via a shared power line, the transfused power card configured to export electrical current via an intravoltage port when the transfused power card is receiving electrical current, above a threshold, from the power supply unit, and import electrical current via the intravoltage port when the transfused power card is not receiving electrical current, above the threshold, from the power supply unit.

17 Claims, 3 Drawing Sheets

SHARING POWER BETWEEN TWO OR MORE POWER SHARING SERVERS

BACKGROUND OF THE INVENTION

1. Field of the Invention

The field of the invention is data processing, or, more specifically, methods, apparatus, and systems for sharing power between two or more power sharing servers.

2. Description Of Related Art

Modern computing equipment and servers, such as blade servers, are frequently housed in "lights out" datacenters. These datacenters may be managed remotely, without the benefit of local administrative personnel. As such, when computing machinery that is housed within these data centers malfunctions, diagnostics cannot be performed locally without requiring an administrator to travel to the datacenter, which may be time consuming and expensive. Diagnostics may, however, be perform remotely. In order to perform remote diagnostics, the malfunctioning piece of computing machinery must be receiving electrical power so that remote management components of the malfunctioning piece of computing machinery can be accessed.

SUMMARY OF THE INVENTION

Methods, apparatus, and systems are disclosed for sharing power between two or more power sharing servers that include determining, by a transfused power card in a particular power sharing server, whether the transfused power card is receiving electrical current from a power supply unit; exporting electrical current via an intravoltage port when the transfused power card is receiving electrical current, above a threshold, from the power supply unit; and importing electrical current via the intravoltage port when the transfused power card is not receiving electrical current, above the threshold, from the power supply unit, wherein the intravoltage port of the particular server is coupled to an intravoltage port of a different power sharing server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
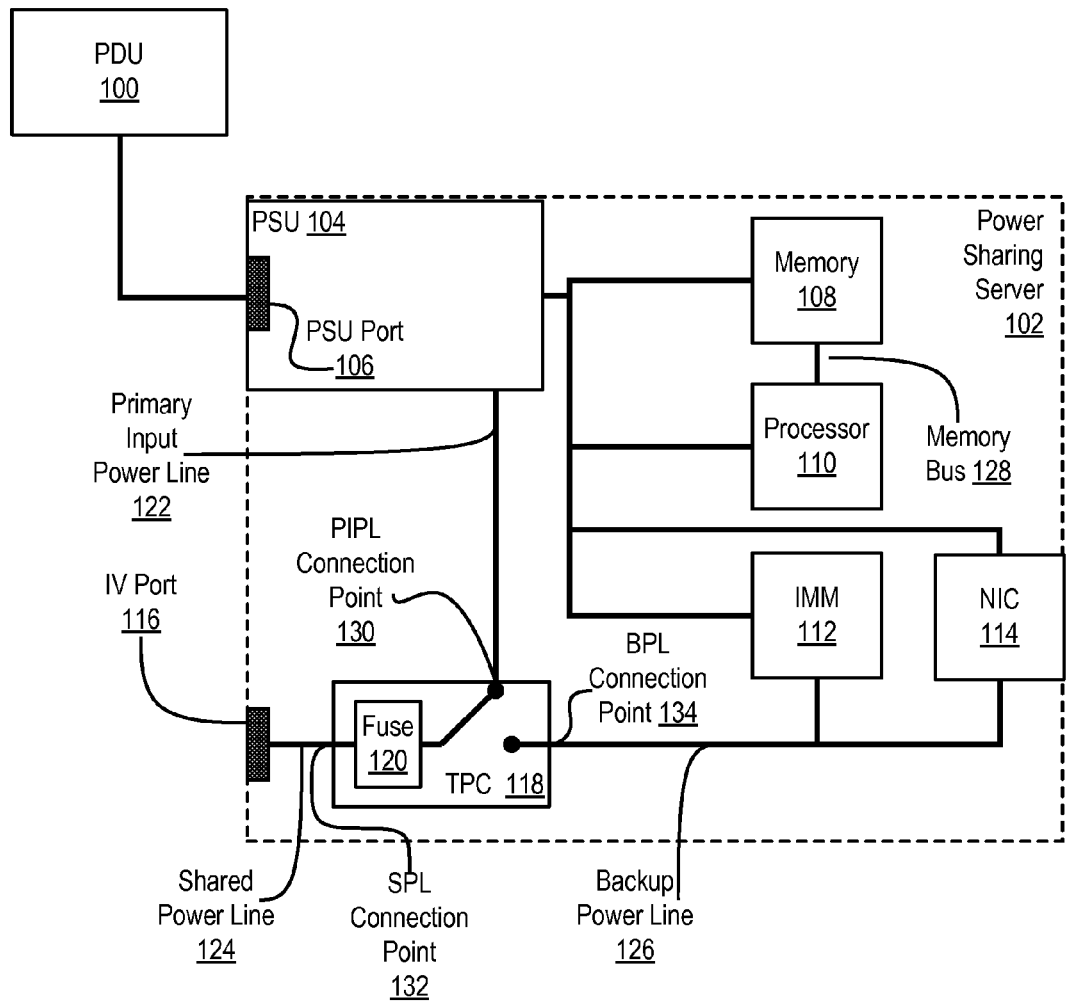
FIG. 1 sets forth a block diagram of a power sharing server according to embodiments of the present invention.

Exemplary methods, apparatus, and systems for sharing power between two or more power sharing servers in accordance with the present invention are described with reference to the accompanying drawings, beginning with FIG. 1. FIG. 1 sets forth a block diagram of a power sharing server (102) according to embodiments of the present invention. The power sharing server (102) of FIG. 1 includes a computer processor (110) and a computer memory (108) operatively coupled to the computer processor (110). In the example of FIG. 1, the computer processor (110) and the computer memory (108) are operatively coupled via a memory bus (128). This embodiment is only included for illustrative purposes, as readers of skill in the art will appreciate that the computer processor (110) and the computer memory (108) may be indirectly coupled using a bus adapter, additional data communications busses, and so on. The power sharing server (102) may also include additional components such as, for example, input/output adapters, communications adapters, video adapters, expansion busses, various forms of computer memory, and so on.

The power sharing server (102) of FIG. 1 also includes a power supply unit (104) coupled to a power domain unit (100) via a power supply unit port (106). The power domain unit (100) of FIG. 1 is a power source that provides electrical current to one or more power supply units (104). The power supply unit (104) of FIG. 1 is a component in the power sharing server (102) that supplies electrical current to other components in the power sharing server (102) such as, for example, the computer memory (108), the computer processor (110), a Network Interface Controller ('NIC') (114), and an Integrated Management Module ('IMM') (112). The power supply unit (104) of FIG. 1 may be configured, for example, to convert alternating current received from the power domain unit (100) to low-voltage direct current that is usable by the other components of the power sharing server (102). In the example of FIG. 1, the power supply unit (104) may be coupled to the power domain unit (100) via the power supply unit port (106) of FIG. 1, which is configured to receive an electrical connection from the power domain unit (100).

The power sharing server (102) of FIG. 1 also includes an intravoltage port (116) configured to receive a shared power cable (not shown) coupled to an intravoltage port of a different power sharing server (not shown). The intravoltage port (116) of FIG. 1 may therefore be utilized to draw electrical current from other power sharing servers that are connected to the power sharing server (102) via the intravoltage port (116). Likewise, the intravoltage port (116) of FIG. 1 may also be utilized by other power sharing servers that are connected to the power sharing server (102) via the intravoltage port (116) to draw electrical current from the power sharing server (102). The intravoltage port (116) therefore establishes a connection point to the power sharing server (102) for the bidirectional exchange of electrical current between the power sharing server (102) and other power sharing servers that are connected to the power sharing server (102) via the intravoltage port (116).

The power sharing server (102) of FIG. 1 also includes a transfused power card (118) coupled to the power supply unit (104) via a primary input power line (122). The transfused power card (118) of FIG. 1 is special purpose computer logic configured to import electrical current to the power sharing server (102) and also configured to export electrical current from the power sharing server (102). In the example of FIG. 1, the transfused power card (118) may import electrical current to the power sharing server (102) from another power sharing server (not shown) via the intravoltage port (116) as described in more detail below. In the example of FIG. 1, the transfused power card (118) may also export electrical current from the power sharing server (102) to another power sharing server (not shown) via the intravoltage port (116) as described in more detail below.

The transfused power card (118) of FIG. 1 may be configured such that an electrical connection exists between the point (130) at which the primary input power line (122) connects to the transfused power card (118) and the point (132) at which the shared power line (124) connects to the transfused power card (118). In the example of FIG. 1, the transfused power card (118) may include a current sensing switch that establishes such a connection when the transfused power card (118) detects that electrical current, above a threshold, is being received from the power supply unit (104). The threshold may be a predetermined threshold such as, for example, a number of amperes of electrical current. In such an embodiment, the transfused power card (118) can export electrical current via an intravoltage port (116) when the transfused power card (118) is receiving electrical current, above a threshold, from the power supply unit (104).

The transfused power card (118) of FIG. 1 may further be configured such that an electrical connection exists between the point (132) at which the shared power line (124) connects to the transfused power card (118) and the point (134) at which the backup power line (126) connects to the transfused power card (118). In the example of FIG. 1, the transfused power card (118) may include a current sensing switch that establishes such a connection when the transfused power card (118) detects that current received from the power supply unit (104) is below a threshold. In such an example, electrical current may be drawn by components, such as the IMM (112) and the NIC (114), connected to the backup power line (126). Electrical current is drawn by these components via the transfused power card (118) and the intravoltage port (116), through which the power sharing server (102) is electrically connected to other power sharing servers, thereby enabling the transfused power card (118) to import electrical current.

In the example of FIG. 1, because the transfused power card (118) is coupled to remote management components of the power sharing server (102), such as the IMM (112) and the NIC (114), via a backup power line (126), the transfused power card (118) can deliver electrical current to the remote management components in the event that the power supply unit (104) completely fails or provides less electrical current that is needed. The remote management components of the power sharing server (102), such as the IMM (112) and the NIC (114), typically receive electrical current from the power supply unit (104). If sufficient electrical current is not available from the power supply unit (104), however, the transfused power card (118) can deliver electrical current to the remote management components. In such an embodiment, the remote management components may therefore be accessible even in the event that the power supply unit (104) fails. Although the power supply unit (104) has failed, the remote management components may receive electrical current that the transfused power card (118) has imported into the power sharing server (102) via the intravoltage port (116). This electrical current received from the transfused power card (118) can enable the remote management components to remain operational so that a system administrator or other entity can retrieve diagnostic information that preceded the failure of the power supply unit (104).

In the example of FIG. 1, the transfused power card (118) may be configured to regulate an amount of electrical current to export via the shared power line (124). By regulating the amount of electrical current to export via the shared power line (124), the transfused power card (118) may avoid damage that can result from excessive electrical current flow. For example, consider an embodiment in which the power sharing server (102) was coupled to many other power sharing servers (not shown). In such an embodiment, if the power supply units in each of other power sharing servers ceased operating properly, each of the other power sharing servers would begin to draw electrical current from the power sharing server (102), to the point where the amount of electrical current flowing through the transfused power card (118) could damage the transfused power card (118). In such an example, the transfused power card (118) would not sacrifice itself for the other power sharing servers given that the amount of electrical current to export via the shared power line (124) is regulated. The transfused power card (118) would not allow such a damaging amount of current to flow through the transfused power card (118) but would instead cease exporting electrical current altogether or only export electrical current at levels that cause no damage to the transfused power card (118).

In the example of FIG. 1, regulating the amount of electrical current to export via the shared power line (124) may be carried out, for example, using a fuse (120). The fuse (120) of FIG. 1 is an overcurrent protection device that interrupts the flow of electrical current when the amount of electrical current flowing through the fuse (120) exceeds the maximum amount of electrical current flow allowed through the fuse (120). For example, when the amount of electrical current flowing through the fuse (120) exceeds the maximum amount of electrical current flow allowed through the fuse (120), the fuse (120) may blow such that no electrical current flows through the fuse (120), thereby preventing any electrical current from being exported via the shared power line (124). Alternatively, the fuse (120) may be embodied such that when the amount of electrical current flowing through the fuse (120) exceeds the maximum amount of electrical current flow allowed through the fuse (120), the physical attributes of the fuse (120) are such that electrical impedance across the fuse (120) increases to the point that the amount of electrical current which flows through the fuse (120) is limited, thereby limiting the amount of electrical current being exported via the shared power line (124). In the example of FIG. 1, the fuse (120) may be embodied as a digital fuse or other resettable fuse as will occur to those of skill in the art. Readers will appreciate that the fuse (120) may alternatively be embodied as a circuit breaker or other device capable of limiting the flow of electrical current.

Figure 2:
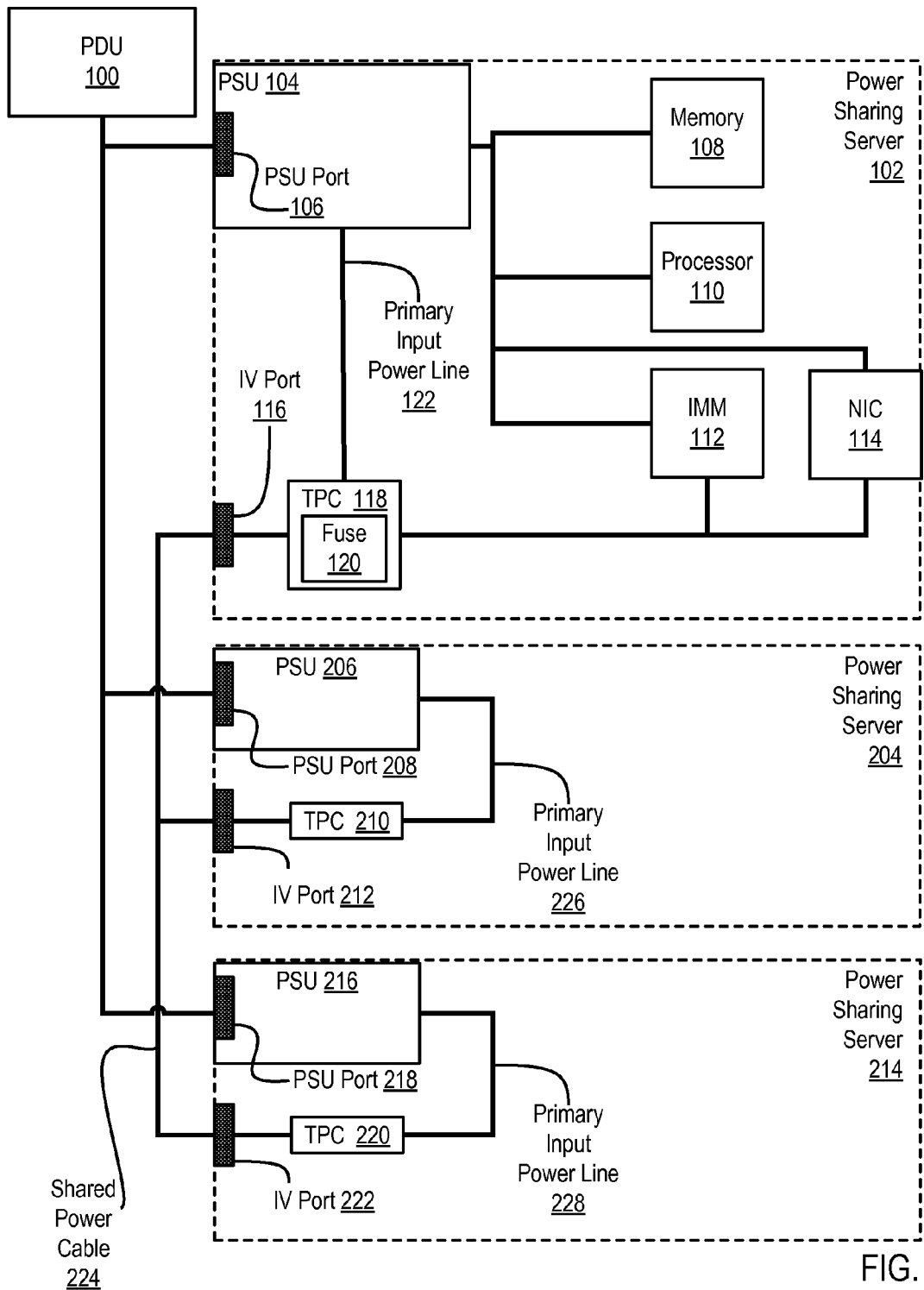
FIG. 2 sets forth a block diagram of a system for sharing power between two or more power sharing servers according to embodiments of the present invention.

For further explanation, FIG. 2 sets forth a block diagram of a system for sharing power between two or more power sharing servers (102, 204, 214) according to embodiments of the present invention. The system of FIG. 2 includes two or more power sharing servers (102, 204, 214). Although all of the details of each power sharing server (102, 204, 214) are not illustrated in FIG. 2, readers will appreciate that each of the power sharing servers (102, 204, 214) is similar to the power sharing server described above with reference to FIG. 1, as each power sharing server (102, 204, 214) includes a computer processor (110) and a computer memory (108) operatively coupled to the computer processor (110).

In the example of FIG. 2, each of the power sharing servers (102, 204, 214) also includes a power supply unit (104, 206, 216) coupled to a power domain unit (100) via a power supply unit port (106, 208, 218). The power domain unit (100) of FIG. 2 is a power source that provides electrical current to one or more power supply units (104, 206, 216). The power supply units (104, 206, 216) of FIG. 2 are components in each power sharing server (102, 204, 214) that supply electrical current to other components in each power sharing server (102, 204, 214) such as, for example, the computer memory (108), the computer processor (110), a NIC (114), and an IMM (112).

In the example of FIG. 2, each of the power sharing servers (102, 204, 214) also includes an intravoltage port (116, 212, 222) configured to receive a shared power cable (224) coupled to an intravoltage port (116, 212, 222) of a different power sharing server. The shared power cable (224) of FIG. 2, for example, connects all three of the illustrated power sharing servers (102, 204, 214) via the respective intravoltage port (116, 212, 222) of each power sharing server (102, 204, 214). As such, each power sharing server (102, 204, 214) can import electrical current from the remaining power sharing servers (102, 204, 214) or export electrical current to the remaining power sharing servers (102, 204, 214). For example, power sharing server (102) can import electrical current to power sharing servers (204, 214) or export electrical current to power sharing server (204, 214). Although only three power sharing servers (102, 204, 214) are illustrated in FIG. 2, additional power sharing servers may be added to the system of FIG. 2.

In the example of FIG. 2, each of the power sharing servers (102, 204, 214) also includes a transfused power card (118, 210, 220) coupled to the power supply unit (104, 206, 216) via a primary input power line (122, 226, 228). The transfused power card (118, 210, 220) of FIG. 2 are also coupled to an intravoltage port (116, 212, 222) via a shared power line (not labeled). As described above with reference to FIG. 1, each transfused power card (118, 210, 220) is configured to export electrical current via an intravoltage port (116, 212, 222) when the transfused power card (118, 210, 220) is receiving electrical current, above a threshold, from the power supply unit (104, 206, 216). Each transfused power card (118, 210, 220) is also configured to import electrical current via the intravoltage port (116, 212, 222) when the transfused power card (118, 210, 220) is not receiving electrical current, above the threshold, from the power supply unit (104, 206, 216).

In the example of FIG. 2, each transfused power card (118, 210, 220) regulates the amount of electrical current to export via an intravoltage port (116, 212, 222). As described above with reference to FIG. 1, each transfused power card (118, 210, 220) may regulate the amount of electrical current to export via an intravoltage port (116, 212, 222) using a fuse (120). In the example of FIG. 2, each transfused power card (118, 210, 220) may regulate the amount of electrical current to export via an intravoltage port (116, 212, 222) in dependence upon the amount of electrical current being consumed by the power sharing server (102, 204, 214). For example, when a particular power sharing server (102, 204, 214) is consuming a large amount of electrical current, the amount of electrical current to export via the intravoltage port (116, 212, 222) may be reduced so as not to overburden the power supply unit (104, 206, 216). Likewise, when a particular power sharing server (102, 204, 214) is consuming minimal amounts of electrical current, the amount of electrical current to export via the intravoltage port (116, 212, 222) may be increased given the availability of electrical current from the power supply unit (104, 206, 216).

In the example of FIG. 2, and as described above with reference to FIG. 1, each transfused power card (118, 210, 220) directs electrical current imported via the intravoltage port (116, 212, 222) to remote management components within the power sharing server (102, 204, 214) when the transfused power card (118, 210, 220) is not receiving electrical current, above the threshold, from the power supply unit (104, 206, 216). In the example of FIG. 2, the remote management components can include an IMM (112) and a NIC (114). Although the embodiments illustrated in FIG. 1 and FIG. 2 describe providing backup electrical current only to remote management components when the transfused power card (118, 210, 220) is not receiving electrical current, above the threshold, from the power supply unit (104, 206, 216), readers will understand that backup electrical current may be provided to additional electrical components in the power sharing servers (102, 204, 214).

Figure 3:
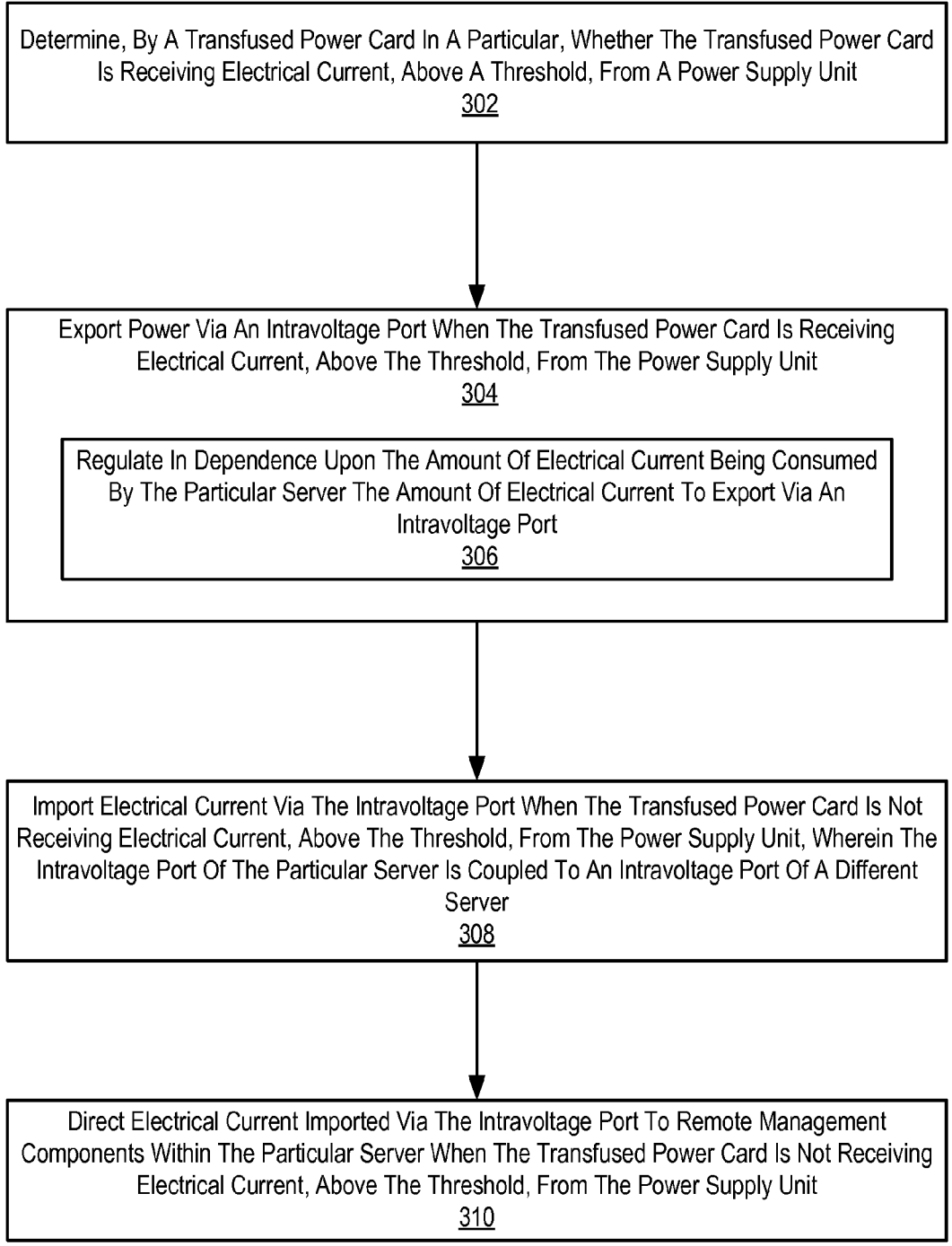
FIG. 3 sets forth a flow chart illustrating an exemplary method for sharing power between two or more power sharing servers according to embodiments of the present invention.

For further explanation, FIG. 3 sets forth a flow chart illustrating an exemplary method for sharing power between two or more power sharing servers according to embodiments of the present invention that includes determining (302), by a transfused power card in a particular power sharing server, whether the transfused power card is receiving electrical current, above a threshold, from a power supply unit. Determining (302) whether the transfused power card is receiving electrical current, above a threshold, from a power supply unit may be carried out, for example, using a ammeter or other device capable of measuring electrical current.

The example of FIG. 3 also includes exporting (304) electrical current via an intravoltage port when the transfused power card is receiving electrical current, above a threshold, from the power supply unit. Exporting (304) electrical current via an intravoltage port may be carried out, for example, by establishing an electrical path from the power supply unit to the intravoltage port. Such an electrical path may be established, for example, using a current sensing switch as described above.

In the example of FIG. 3, exporting (304) electrical current via an intravoltage port when the transfused power card is receiving electrical current from the power supply unit may include regulating (306), by the transfused power card, the amount of electrical current to export via an intravoltage port. Regulating (306) the amount of electrical current to export via an intravoltage port may be carried out, for example, using a fuse as described above. Regulating (306) the amount of electrical current to export via an intravoltage port may also be carried out in dependence upon the amount of electrical current being consumed by the particular power sharing server. For example, when a particular power sharing server is consuming a large amount of electrical current, the amount of electrical current to export via the intravoltage port may be reduced so as not to overburden the power supply unit. Likewise, when a particular power sharing server is consuming minimal amounts of electrical current, the amount of electrical current to export via the intravoltage port may be increased given the availability of electrical current from the power supply unit.

The example of FIG. 3 also includes importing (308) electrical current via the intravoltage port when the transfused power card is not receiving electrical current, above the threshold, from the power supply unit. Importing (308) electrical current via the intravoltage port may be carried out, for example, by establishing an electrical path between the transfused power card and components within a particular power sharing sever, such that those components begin to draw electrical current from the transfused power card. In the example of FIG. 3, the intravoltage port of the particular power sharing server is coupled to an intravoltage port of a different power sharing server. As a result of the electrical connection between two power sharing servers, components in the particular power sharing server whose transfused power card is not receiving electrical current, above the threshold, from the power supply unit may began to draw electrical current from the transfused power card—electrical current that is provided to the transfused power card from a different power sharing server.

The example of FIG. 3 also includes directing (310) electrical current imported via the intravoltage port to remote management components within the particular power sharing server when the transfused power card is not receiving electrical current, above the threshold, from the power supply unit. Directing (310) electrical current imported via the intravoltage port to remote management components within the particular power sharing server may be carried out, for example, by establishing an electrical connection between the transfused power card and the remote management components such that electrical current can flow from the transfused power card to the remote management components. In the example of FIG. 3, the remote management components can include an IMM, a NIC, and so on.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A power sharing server, the power sharing server comprising:
   a computer processor;
   a computer memory operatively coupled to the computer processor;
   a power supply unit coupled to a power domain unit via a power supply unit port;
   an intravoltage port configured to receive a shared power cable coupled to an intravoltage port of a different power sharing server; and
   a transfused power card coupled to the power supply unit via a primary input power line, the transfused power card further coupled to the intravoltage port via a shared power line, the transfused power card further configured to:
      export electrical current via an intravoltage port when the transfused power card is receiving electrical current, above a threshold, from the power supply unit, and
      import electrical current via the intravoltage port when the transfused power card is not receiving electrical current, above the threshold, from the power supply unit.

2. The power sharing server of claim 1 wherein the transfused power card is further coupled to remote management components of the power sharing server via a backup power line.

3. The power sharing server of claim 2 wherein the remote management components of the power sharing server include an Integrated Management Module ('IMM') and a Network Interface Controller ('NIC').

4. The power sharing server of claim 1 wherein the transfused power card is further configured to:
   regulate an amount of electrical current to export via the intravoltage port.

5. The power sharing server of claim 4 wherein the transfused power card regulates an amount of electrical current to export via the shared power line using a fuse.

6. A system for sharing power between two or more power sharing servers, the system comprising:
   two or more power sharing servers, wherein each power sharing server includes:
      a computer processor;
      a computer memory operatively coupled to the computer processor;
      a power supply unit coupled to a power domain unit via a power supply unit port;
      an intravoltage port configured to receive a shared power cable coupled to an intravoltage port of a different power sharing server; and
      a transfused power card coupled to the power supply unit via a primary input power line, the transfused power card further coupled to the intravoltage port via a shared power line, the transfused power card further configured to:
         export electrical current via an intravoltage port when the transfused power card is receiving electrical current, above a threshold, from the power supply unit, and
         import electrical current via the intravoltage port when the transfused power card is not receiving electrical current, above the threshold, from the power supply unit; and
      wherein the intravoltage ports of at least two of the power sharing servers are coupled via a power cable.

7. The system of claim 6 further comprising a power domain unit coupled to at least one of the power sharing servers via the power supply unit port of the power sharing server, wherein the power domain unit provides electrical current to the power sharing server via the power supply unit port.

8. The system of claim 6 wherein the transfused power card is further configured to regulate an amount of electrical current to export via the intravoltage port.

9. The system of claim 8 wherein the transfused power card regulates the amount of electrical current to export via the intravoltage port using a digital fuse.

10. The system of claim 8 wherein the transfused power card regulates the amount of electrical current to export via the intravoltage port in dependence upon an amount of electrical current being consumed by the power sharing server.

11. The system of claim 6 wherein the transfused power card directs electrical current imported via the intravoltage port to remote management components within the power sharing server when the transfused power card is not receiving electrical current, above the threshold, from the power supply unit.

12. The system of claim 11 wherein the remote management components include an Integrated Management Module ('IMM') and a Network Interface Controller ('NIC').

13. A method of sharing power between two or more power sharing servers, the method comprising:
   determining, by a transfused power card in a particular power sharing server, whether the transfused power card is receiving electrical current from a power supply unit;
   exporting electrical current via an intravoltage port when the transfused power card is receiving electrical current, above a threshold, from the power supply unit; and
   importing electrical current via the intravoltage port when the transfused power card is not receiving electrical current, above the threshold, from the power supply unit,
   wherein the intravoltage port of the particular power sharing server is coupled to an intravoltage port of a different power sharing server.

14. The method of claim 13 wherein exporting electrical current via the intravoltage port when the transfused power card is receiving electrical current from the power supply unit further comprises regulating, by the transfused power card, an amount of electrical current to export via the intravoltage port.

15. The method of claim 14 wherein the amount of electrical current to export via the intravoltage port is regulated in dependence upon an amount of electrical current being consumed by the particular power sharing server.

16. The method of claim 13 further comprising directing electrical current imported via the intravoltage port to remote management components within the particular power sharing server when the transfused power card is not receiving electrical current from the power supply unit.

17. The method of claim 16 wherein the remote management components include an Integrated Management Module ('IMM') and a Network Interface Controller ('NIC').

* * * * *